United States Patent
Anderson et al.

(10) Patent No.: US 7,467,066 B2
(45) Date of Patent: Dec. 16, 2008

(54) SYSTEM AND METHOD FOR BENCHMARKING CORRELATED STREAM PROCESSING SYSTEMS

(75) Inventors: Kay S. Anderson, Washington, DC (US); Joseph P. Bigus, Rochester, MN (US); Eric Bouillet, Jersey City, NJ (US); Parijat Dube, Yorktown Heights, NY (US); Zhen Liu, Tarrytown, NY (US); Dimitrios Pendarakis, Westport, CT (US)

(73) Assignee: International Business Machines Corporation, Armonk, NY (US)

(*) Notice: Subject to any disclaimer, the term of this patent is extended or adjusted under 35 U.S.C. 154(b) by 31 days.

(21) Appl. No.: 11/418,740

(22) Filed: May 5, 2006

(65) Prior Publication Data

US 2007/0260428 A1    Nov. 8, 2007

(51) Int. Cl.
*G06F 15/00* (2006.01)
*G01R 31/00* (2006.01)

(52) U.S. Cl. .................. 702/186; 702/119; 702/122; 702/123; 370/252

(58) Field of Classification Search .......... 702/108, 702/117–119, 122, 123, 186; 703/24; 714/712–717; 370/252

See application file for complete search history.

(56) References Cited

U.S. PATENT DOCUMENTS

| | | | |
|---|---|---|---|
| 5,930,497 A | | 7/1999 | Cherian et al. |
| 6,028,847 A | * | 2/2000 | Beanland .................. 370/252 |
| 6,480,977 B1 | | 11/2002 | Apisdorf et al. |
| 6,597,660 B1 | | 7/2003 | Rueda et al. |
| 6,845,352 B1 | * | 1/2005 | Wang ........................ 703/24 |
| 2003/0217162 A1 | | 11/2003 | Fu et al. |
| 2005/0025054 A1 | | 2/2005 | D. et al. |

OTHER PUBLICATIONS

U.S. Appl. No. 11/327,071, filed Jan. 6, 2006, Anderson.

\* cited by examiner

*Primary Examiner*—Jeffrey R. West
*Assistant Examiner*—Phuong Huynh
(74) *Attorney, Agent, or Firm*—Jon A. Gibbons; Fleit Gibbons Gutman Bongini & Bianco P.L

(57) ABSTRACT

A system, method, and computer program product for benchmarking a stream processing system are disclosed. The method comprises generating a plurality of correlated test streams. A semantically related data set is embedded within each of the test streams in the plurality of correlated test streams. The plurality of correlated test streams is provided to at least one stream processing system. A summary is generated for each of the semantically related embedded data sets. A common identifier, which is transparent to the system being tested, is embedded within each stream in the plurality of correlated test streams. The common identifier is extracted from the output data set generated by the stream processing system. At least one of the stored copies of the summaries and the common identifier are compared to an output data set including a set of zero or more correlation results generated by the stream processing system.

11 Claims, 11 Drawing Sheets

```
<metadata>
    <stream_identifier> UniqueStreamName </stream_identifier>
    <stream_type> chat_session </stream_type>
    <date_and_time> 2006-03-27:09:35:30 </date_and_time>
    <duration> 11:00:00 </duration>
    <attributes>
        <session type> point-to-point </session type>
        <dictionary> English_US </dictionary>
        <communicating_parties>
            <item> name A </item>
            <item> name B </item>
        </communicating_parties>
        <challenges>
            <item>
                <text> stock tip </text>
                <occurrence_time> 2006-03-27:09:37:22 </occurence_time>
            </item>
            <item>
                <text> TICK </text>
                <occurrence_time> 2006-03-27:09:39:46 </occurence_time>
            </item>
        </challenges>
    </attributes>
</metadadata>
```

SYSTEM AND METHOD FOR BENCHMARKING CORRELATED STREAM PROCESSING SYSTEMS

STATEMENT REGARDING FEDERALLY SPONSORED RESEARCH OR DEVELOPMENT

This invention was made with government support under subcontract TIA H98230-04-3-0001 awarded by the Department of Defense. The Government has certain rights in this invention.

FIELD OF THE INVENTION

The present invention generally relates to the field of stream processing systems, and more particularly relates to the benchmarking of stream processing systems.

BACKGROUND OF THE INVENTION

Stream processing systems analyze various incoming streams to determine dependencies among the streams. For example, analytic modules may process multiple streams to detect common patterns, interdependent events, content generated by common sources or related users, and the like. One way of testing these systems is to transmit test streams with known parameters to the stream processing system. Therefore, stream generation is employed for performance characterization, testing, and benchmarking of stream processing systems dealing with processing, forwarding, storing and/or analysis of stream traffic. Stream generation typically aims to simulate or emulate streams generated by different types of applications, protocols and activities. For example, the activities might include email, chat, web browsing, message boards, newsgroups, cellular activity, and the like. Different approaches have been used for generating the streams, such as model driven simulations and client-server architectures.

Examples of currently available stream generation tools include commercial products such as LoadRunner, Netpressure, Http-Load, and MegaSIP; and academic prototypes such as SURGE, Wagon, Httperf, Harpoon, NetProbe, D-ITG, MGEN, and LARIAT.

The existing stream generation approaches focus primarily on matching predetermined volumetric and timing properties, and ignore statistical properties at the content level, such as content and contextual semantics. Most of the existing approaches for stream generation are application specific or lack scalability and/or modularity. Another problem with current stream generating systems is that they are domain/protocol specific. For example, current stream generating systems generate a single type of stream, e.g. web requests. Multiple streams can be generated but they are uncorrelated streams with little or no content richness. Current stream generating systems are not suitable for testing and benchmarking stream processing systems that make intelligent decisions based on analysis of content in correlated streams.

Therefore a need exists to overcome the problems with the prior art as discussed above.

SUMMARY OF THE INVENTION

Briefly, in accordance with the present invention, disclosed are a system, method, and computer program product for benchmarking a stream processing system. The method comprises generating a plurality of correlated test streams. A semantically related data set is embedded within each of the test streams in the plurality of correlated test streams. The plurality of correlated test streams is provided to at least one stream processing system. The stream processing system produces an output data set including a set of zero or more correlation results.

A summary is generated for each of the semantically related embedded data sets. A copy of each summary is stored in memory. A common identifier is embedded within each stream in the plurality of correlated test streams. Wherein the common identifier is transparent to the at least one stream processing system so as not to affect the set of the correlation results. Wherein the common identifier uniquely identifies the plurality of correlated test streams. The common identifier is extracted from the output data set generated by the stream processing system. At least one of the common identifier and the stored copies of the summaries are compared to the output data set generated by the stream processing system.

In another embodiment of the present invention, an information processing system is disclosed for benchmarking a stream processing system. The information processing system comprises a test stream generator for generating a plurality of correlated test streams. Each test stream in the plurality of correlated test streams includes a semantically related embedded data set. A test stream transmitter is also included for providing the plurality of correlated test streams to at least one stream processing system. A comparator is also included for comparing at least one of the copies of the summaries of the semantically related embedded data and the common identifier to an output data set including a set of zero or more correlation results generated by the stream processing system.

In yet another embodiment of the present invention, a computer program product for benchmarking a stream processing system is disclosed. The computer program product includes instructions for generating a plurality of correlated test streams. A semantically related data set is embedded within each of the test streams in the plurality of correlated test streams. The plurality of correlated test streams is provided to at least one stream processing system. The stream processing system produces an output data set including a set of zero or more correlation results.

A summary is generated for each of the semantically related embedded data sets. A copy of each summary is stored in memory. A common identifier is embedded within each stream in the plurality of correlated test streams. Wherein the common identifier is transparent to the at least one stream processing system so as not to affect the set of the correlation results. Wherein the common identifier uniquely identifies the plurality of correlated test streams. The common identifier is extracted from the output data set generated by the stream processing system. At least one of the common identifier and the stored copies of the summaries are compared to the output data set generated by the stream processing system.

An advantage of the foregoing embodiment is that multiple traffic streams, which are correlated, are generated and transmitted to a stream processing system to be tested. The presented invention allows for the testing and benchmarking of systems which make intelligent decisions based on analysis of content in correlated streams.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

FIG. 3 is an exemplary metadata listing associated with a generated traffic stream, according to an embodiment of the present invention;

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The present invention, according to an embodiment, overcomes problems with the prior art by generating multiple traffic streams, which are correlated and transmitting these correlated streams to a stream processing system to be tested. The presented invention allows for the testing and benchmarking of systems which make intelligent decisions based on analysis of content in correlated streams.

Exemplary System For Benchmarking A Stream Processing System

Figure 1:
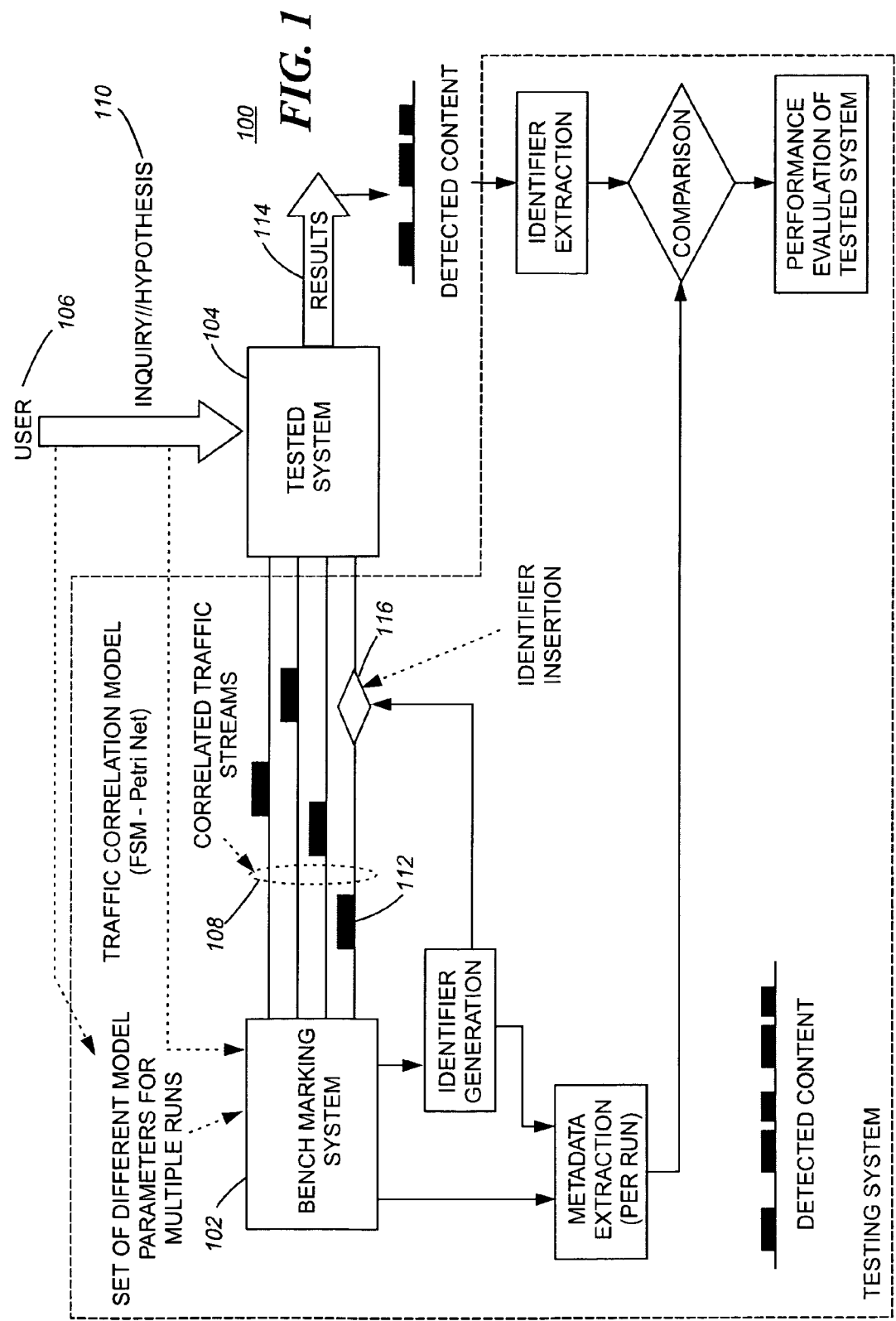
FIG. 1 is block diagram illustrating an exemplary system for benchmarking a stream processing system, according to an embodiment of the present invention.

According to an embodiment of the present invention, as shown in FIG. 1, an exemplary system 100 for benchmarking a stream processing system 104 is illustrated. FIG. 1 shows a benchmarking information processing system 102 and a tested information processing system 104. Although FIG. 1 shows the benchmarking and tested systems 102, 104 as single systems, it should be understood that one of both of the systems 102, 104 can be distributed systems comprised of a plurality of processing units. The testing system 102 is discussed in greater detail below. A user 106 of the tested system 104 enters a correlation inquiry 110 into the tested system 104, which is a system for making intelligent decisions based on analysis of content in correlated streams. For example, the user 106 may inquire if any insider trading activity regarding a specific company has occurred between two people, a group of people, businesses, and the like.

The testing system 102 generates multiple correlated test traffic streams 108 based on the inquiry 110 of the user 106. Metadata 226 (FIG. 2) summarizing each generated traffic stream 108 is stored within the testing system 102. The testing system 102 also creates a common identifier 116 for each set of correlated traffic streams 108 used in a particular test. For example, the four correlated traffic streams 108 shown in FIG. 1 are all generated for a particular benchmarking test. The common identifier 116 allows the testing system 102 to identify the particular test and correlated streams used when comparing the results 114 of the tested system 104. The common identifier 116, in one embodiment, is a unique bit pattern common to each traffic stream in a set of correlated traffic streams 108. The encoding of the common identifier 116, in one embodiment, is stream-type dependent. For example, in a video stream the common identifier is encoded differently than the common identifier for a stream generated for encoded voice data. The correlated traffic streams 108 each include data units 112 comprising information specific to the particular traffic stream 108. In one embodiment, the user 106 is a user of the testing system 102 and enters correlation parameters directly into the testing system 102, as shown in FIG. 1. The correlated traffic streams 108 will be discussed in greater detail below.

The correlated traffic streams 108, in one embodiment, are transmitted to the tested system 104 either on a single link or by multiple links. Also, the correlated traffic streams 108, in one embodiment, are transmitted directly into the tested system 104. In another embodiment, the correlated traffic streams 108 are transmitted to the tested system 104 through an intermediate network comprised of links and switches/routers. The tested system 104 generates results 114 based on the inputted streams 108. The testing system 102 extracts the common identifier information 116 from the results 114 so that it can identify which streams were associated with the particular test. Once the testing system 102 identifies the correlated streams 108 used for the particular test, the testing system 102 retrieves the metadata 226 associated with each of the correlated traffic streams 108. The retrieved metadata 226, in one embodiment, includes a summary of the content of each stream, challenges presented in each stream, the number of streams fired in a particular test, actual finite state machine parameters for each run, and the like.

The testing system 102 compares the results 114 of the tested system 104 with the metadata 226 of the streams 108 used for the benchmarking test. For example, testing system 102, based upon the metadata 226 for each stream 108 in a test can identify the correlation/dependencies between each of the streams 108. The testing system 100 analyzes how well the tested system 104 identified the dependencies, if at all, between the inputted correlated streams 108. The results 114 of the tested system 104, in one embodiment, includes binary output indicating the presence (or lack thereof) of correlated content according to the inquiry entered by the user 106. The results 114, in one embodiment, also include segments of received streams including relevant content.

Exemplary Testing System

Figure 2:
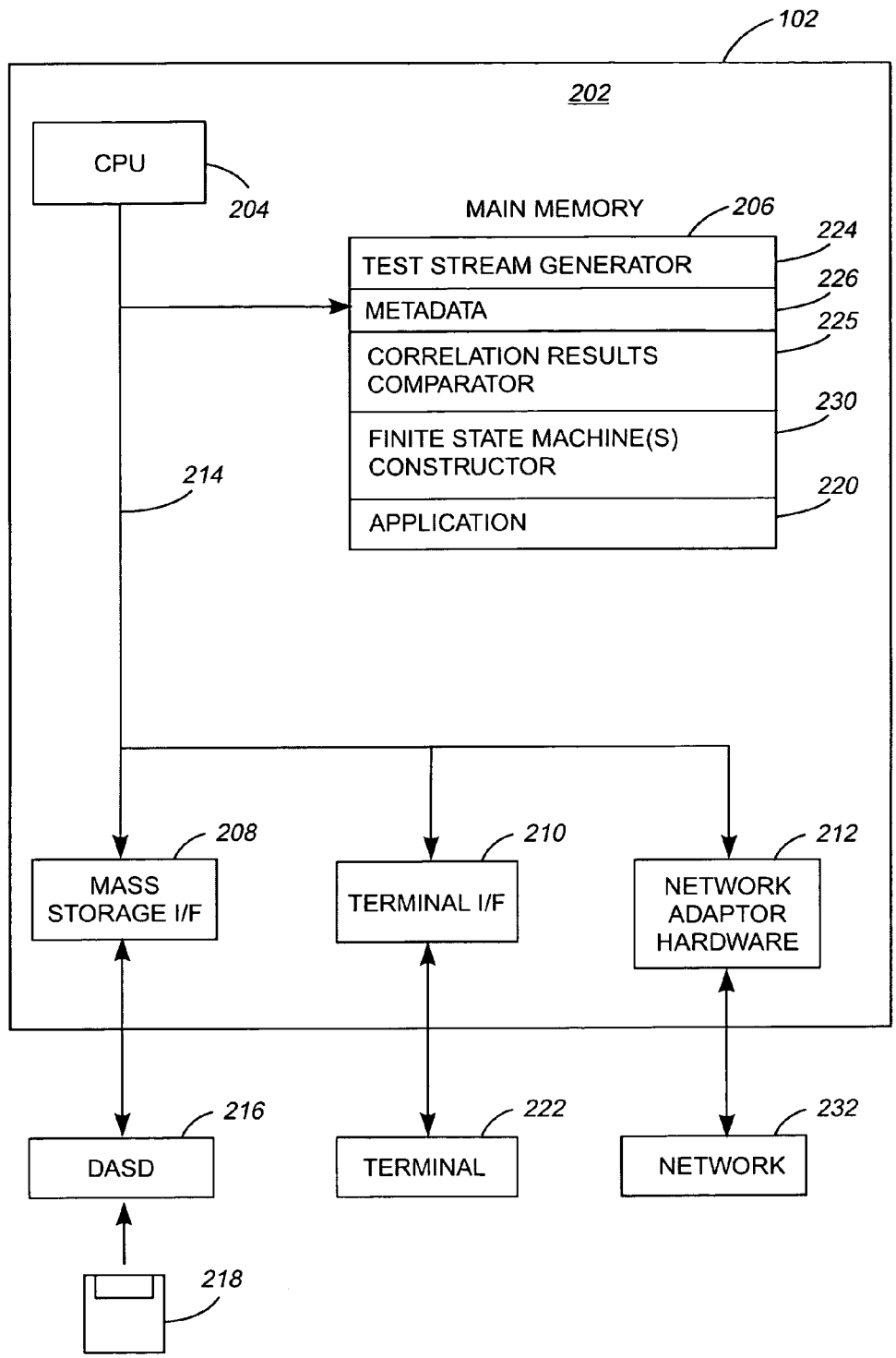
FIG. 2 is a block diagram illustrating a more detailed view of the benchmarking system of FIG. 1, according to an embodiment of the present invention.

FIG. 2 is a block diagram illustrating a more detailed view of the testing system 102 according to an embodiment of the present invention. The testing system 102 is based upon a suitably configured processing system adapted to implement the exemplary embodiment of the present invention. Any suitably configured processing system is similarly able to be used as the testing system 102 by embodiments of the present invention, for example, a personal computer, workstation, or the like. The testing system 102 includes a computer 202. The computer 202 has a processor 204 that is connected to a main memory 206, mass storage interface 208, terminal interface 210, and network adapter hardware 212. A system bus 214 interconnects these system components. The mass storage interface 208 is used to connect mass storage devices, such as data storage device 216, to the testing system 102. One specific type of data storage device is a computer readable medium such as a floppy disk drive, which may be used to store data to and read data from a floppy diskette 218 or CD (not shown). Another type of data storage device is a data storage device configured to support NTFS type file system operations.

The main memory 206 comprises the traffic stream generator 224. The traffic stream generator creates 224 multiple traffic streams 108 comprising correlations among each stream. The correlations, in one embodiment, are contextual correlations, temporal correlations (or time-domain correlations), community of interest correlations, or set correlations, and the like. Contextual correlations refer to the existence of related content across different traffic streams. Temporal or time-domain correlations are the appearance of related events or content separated by a time shift. Temporal correlations can appear within the same stream (intra-stream) and/or across different streams (inter-stream). An example of a community of interest correlation is a user being a part of a group or company. Community of interest correlations can be stochastic, temporal, and the like. For example, a stochastic set relation can be a user within a group or company or a company being a subset of another company. The testing system 102, in one embodiment, supports complex set relationships that are defined by social networks.

In one embodiment, the traffic stream generator 224 generates correlated traffic streams 108 based on one or more correlation inquires 110 entered by a user 106 of the system 104 being tested. For example, the user 106 can enter a correlation inquiry regarding the existence of certain patterns/content of interest among the input traffic streams. The streams can be audio streams, video streams, data streams, such as stock transaction information, and the like. In one embodiment, common model parameters such as communication participants, type of actions, keywords, and the like can be used to generate the correlated traffic streams 108. The correlation inquiry 110 is used to drive traffic stream generation by determining the target stream correlation that the testing system 102 should generate. In one embodiment, the user 106 specifies correlations in the form of a finite state machine ("FSM"). In another embodiment, a finite state machine constructor 230 residing in the main memory 206 of the testing system 102 automatically constructs the FSM from the correlation inquiry entered by the user 106.

In yet a further embodiment, the traffic stream generator 224 can generate individual streams based on templates as described in the patent application 11/327,071, entitled "A Template-Based Approach For Workload Generation", commonly assigned herewith to International Business Machines and is incorporated by reference in its entirety. A template is a common pattern characterizing the traffic to be generated for different layers, different protocols, different users or different application domains. Templates capture the most pertinent and repetitive patterns of traffic and can be combined in a layered or recursive manner to define complex traffic generation models In addition, templates contain fields that allow the specification of different application, protocol and network specific attributes of the traffic. The different attributes are parametric and are treated as variables or random variables. By specifying different values or probability distributions for these parameters, the behavior of a wide population of users, applications and network conditions can be captured.

Finite state machines allow for the dependencies between streams to be captured. The evolution in time of a traffic stream, a set of dependent streams, or the occurrence of events associated with the traffic stream or its dependent traffic streams can all be described using finite state machines. A finite state machine, in one embodiment, is able to be modified dynamically. For example, a finite state machine can be expanded by adding states and transitions or alternatively, a finite state machine can contract by deleting states and transitions. The expansion and/or contraction of a finite state machine occur, for example, in response to changing traffic stream content and/or input from the user 106. In other words, the occurrence of an event triggered either by a traffic model or a user 106 can modify the dependencies between traffic streams dynamically. Therefore, the traffic streams 108 generated by the traffic stream generator 224 are scalable, i.e. the dependencies between streams can be turned on, modified, or turned off dynamically. Corresponding correlation parameters can take values from random user specified distributions. For example, the time shift between two correlated traffic streams with correlated events or the presence of participants from the same company on (a set of) instant messaging sessions, can be controlled through random variables. The farther two events, actions, and the like occur from each other the less correlated the two streams become.

In another embodiment, multiple finite state machines are used in parallel to generate multiple sets of correlated streams. Finite state machines can also be hierarchical. For example, a state or transition of a finite state machine in an upper level of a hierarchy leads to a new finite state machine in the lower level of the hierarchy and vice-a-versa. Finite state machines for capturing the dependencies of correlated streams can be implemented using a variety of mechanisms such as scripting languages, Markov chains, stochastic Petri nets, or the like. An example of a finite state machine implemented using a Petri net according to an embodiment of the present invention will be discussed with reference to FIGS. 5-9.

The testing system 102 generates semantically related data 226, e.g. metadata in one embodiment, associated with each generated traffic stream 108. In one embodiment, the metadata 226 is stored in the main memory 206. In another embodiment, the metadata 226 is stored in a database (not shown) either residing in the main memory 206 or outside the main memory 206. The database (not shown) can be located on the testing system 102 or on a network (not shown). The metadata 226 summarizes its associated stream. For example, the stream type, stream ID, and/or the like is included in the metadata 226. The testing system 102 also associates a common identifier with each correlated stream 108 in a set of correlated streams. The common identifier, in one embodiment, is also stored with the metadata 226 in the main memory 206. The common identifier, in one embodiment, can be an ID embedded within each correlated stream or any other type of identifying information as would be understood by those of ordinary skill in the art. The common identifier allows the testing system 102 to verify the capture of correlations ("true positives") by tested system 104. For example, the testing system 104 analyzes the correlation results 114 created by the tested system 104. The results 114 include the common identifier, which is extracted by the testing system 102. The correlation results comparator 228 uses the common identifier to identify which correlated streams were used for a particular benchmarking test. The metadata 226 associated with these streams 108 is retrieved and compared against the correlation results 114. The correlation results comparator 228 determines the number of correlations ("true positives") that were identified by the tested system 104. In one embodiment, the correlation results comparator 228 generates comparison data that can be displayed to a user 106 of the testing system 102 or the tested system 104. The benchmarking test request can come from a user 106 of either the tested system 104 of the testing system 10s. For example, the tested system 104, in one embodiment, is running an application which allows a user 106 to run a benchmarking test via the testing system 102. The testing system 102 is communicatively linked to the tested system 104 by, for example, a network 232. In another embodiment, the benchmark test can be initiated from the testing system 102.

The testing system 102 also comprises an application 220 in the main memory 206. The application 200, in one embodiment, is an application for generating correlated traffic streams 108. The application 220, for example, is running or waiting to be executed. Although illustrated as concurrently resident in the main memory 206, it is clear that respective components of the main memory 206 are not required to be completely resident in the main memory 206 at all times or even at the same time. In one embodiment, the CPU 202 utilizes conventional virtual addressing mechanisms to allow programs to behave as if they have access to a large, single storage entity, referred to herein as a computer system memory, instead of access to multiple, smaller storage entities such as the main memory 206 and data storage device 216. Note that the term "computer system memory" is used herein to generically refer to the entire virtual memory of the testing system 102 information processing system.

Although only one CPU 204 is illustrated for computer 202, computer systems with multiple CPUs can be used equally effectively. Embodiments of the present invention further incorporate interfaces that each includes separate, fully programmed microprocessors that are used to off-load processing from the CPU 204. Terminal interface 210 is used to directly connect one or more terminals 222 to computer 202 to provide a user interface to the server1 106. These terminals 222, which are able to be non-intelligent or fully programmable workstations, are used to allow system administrators and users to communicate with the Testing system 102 information processing system. The terminal 222 is also able to consist of user interface and peripheral devices that are connected to computer 202 and controlled by terminal interface hardware included in the terminal I/F 210 that includes video adapters and interfaces for keyboards, pointing devices, and the like.

An operating system (not shown) included in the main memory is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the server 106.

The network adapter hardware 212 is used to provide an interface to the network 232. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via floppy disk, e.g. floppy disk 218, CD ROM, or other form of recordable media, or via any type of electronic transmission mechanism.

Exemplary Metadata

FIG. 3 shows an exemplary metadata listing 226. This is only an exemplary listing of metadata and is for illustrative purposes only.

Exemplary Stream Dependency vs. Time-Domain Graph

Figure 4:
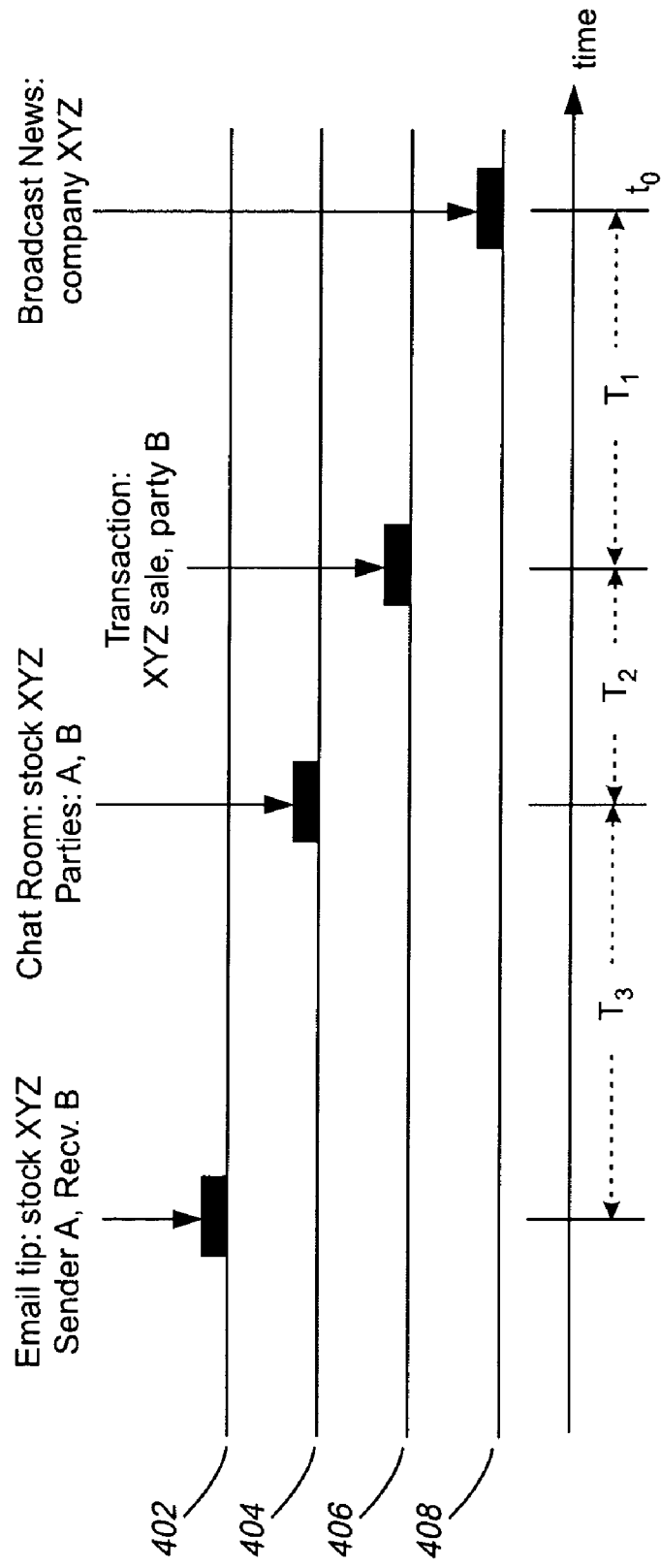
FIG. 4 is an exemplary time-domain graph for generating correlated traffic streams, according to an embodiment of the present invention.

FIG. 4 shows an exemplary time-domain graph for generating correlated traffic streams according to one embodiment of the present invention. As stated above, an exemplary inquiry 110 made by a user 106 is directed at identifying insider trading activities. The present invention is not limited to only this type of inquiry, as should be understood by those of ordinary skill in the art. Primal traffic streams 402, 404, 406, 408 are generated based on the inquiry 110 entered by the user 106. For example, a first traffic stream 402 representing an email from sender A to receiver B discussing a stock XYZ is generated. A second traffic stream 402 representing an instant message from both parties A and B regarding the stock XYZ is generated. A third traffic stream 406 representing a transaction such as a sale of the stock XYZ to party B is also generated. A fourth traffic stream 408 representing a video stream such as broadcast news regarding company XYZ is also generated.

In one embodiment, various benchmarking tests are run with respect to these generated correlated traffic streams 402, 404, 406, 408. The time differences T1, T2, and T3 between each of the correlated traffic streams 402, 404, 406, 408, in one embodiment, are increased, decreased using random distribution. The farther apart two streams are, the less correlated the streams become.

Exemplary Representation of a Finite State Machine Using Petri Nets

FIG. 5 through FIG. 9 show an exemplary representation of a finite state machine for generating correlated traffic streams using Petri Nets. Each Petri Net in FIGS. 6-9 illustrates a progressive sequence of the Petri Net 500 shown in FIG. 5. Although Petri Nets are used for representing a finite state machine the present invention is not limited to this particular mechanism. For example, scripting languages, Markov chains, and the like can also be used to implement a finite state machine. The Petri Nets of FIGS. 5-9 are colored Petri Nets wherein attributes are assigned to tokens as compared to maintaining attributes within states (e.g. regular Petri Net). Colored Petri Nets allow for a more flexible representation of stream content. Also, only the contents of tokens need to be modified when a new hypothesis (e.g. a search for insider trading activity between two parties) is tested. For example, a token can carry entire user profiles and include names of participants, language, IP addresses, and the like.

Figure 5:
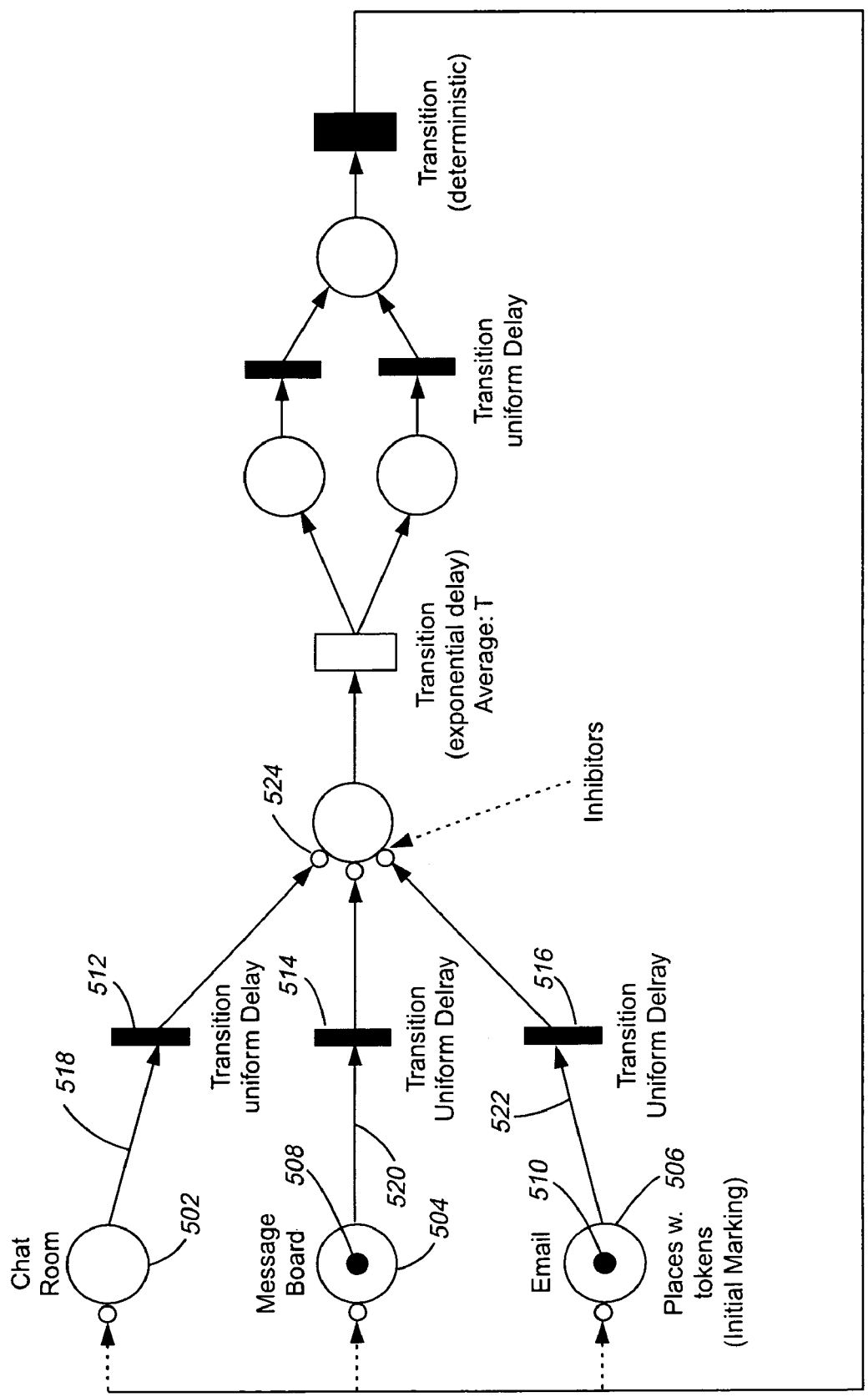
FIGS. 5-9 are realizations of a finite state machine using Petri Nets, according to an embodiment of the present invention.

FIG. 5 shows a Petri-Net 500 for an inquiry 110 of insider trading activities between two parties A and B. The Petri Net 500 includes places and transitions. For example a first place 502 representing chat room activity, a second place 504 representing message board activity, and a third place 506 representing email activity are included in the Petri Net 500 of FIG. 5. Places represent the state and set of conditions that enable the generation of a traffic stream with specific (correlated) content and attributes. The second and third places 504, 506 each include tokens 508, 510 respectively.

Transitions such as a first transition 512, a second transition 514, and a third transition 516 are also included in the Petri Net 500. Transitions trigger the generation of actual stream temporal relations between the different correlated streams/events. Transitions, in one embodiment are of uniform delay, exponential delay, deterministic, or the like. A stochastic Petri Net is created by using a random distribution function for the time delay of the transitions. The placement of tokens 508, 510 (initial marking) determines which transition are enabled and hence, which streams are generated. Arcs such as the arcs 518, 520, 522 connecting the first, second, and third places 502, 504, 506 to their respective transition are also included in the Petri Net 500. Arcs capture the system flow and possible dependencies between the generation of different traffic streams. Arcs from places to transitions are input arcs and arcs from transitions to places are output arcs. For benchmarking the system 104, a test (transmitting multiple correlated streams to the system 104) is run multiple times, each time with different values of initial marking and place/transition parameters (e.g. average time delay). The Petri Net 500, in one embodiment, also includes inhibitors 522, which inhibit the firing of a transition. Petri Nets are advantageous because they are a convenient representation of a system flow, allow for tunable parameterization, give a visual representation of a system at different time intervals, and allow for temporal dependencies.

Figure 6:
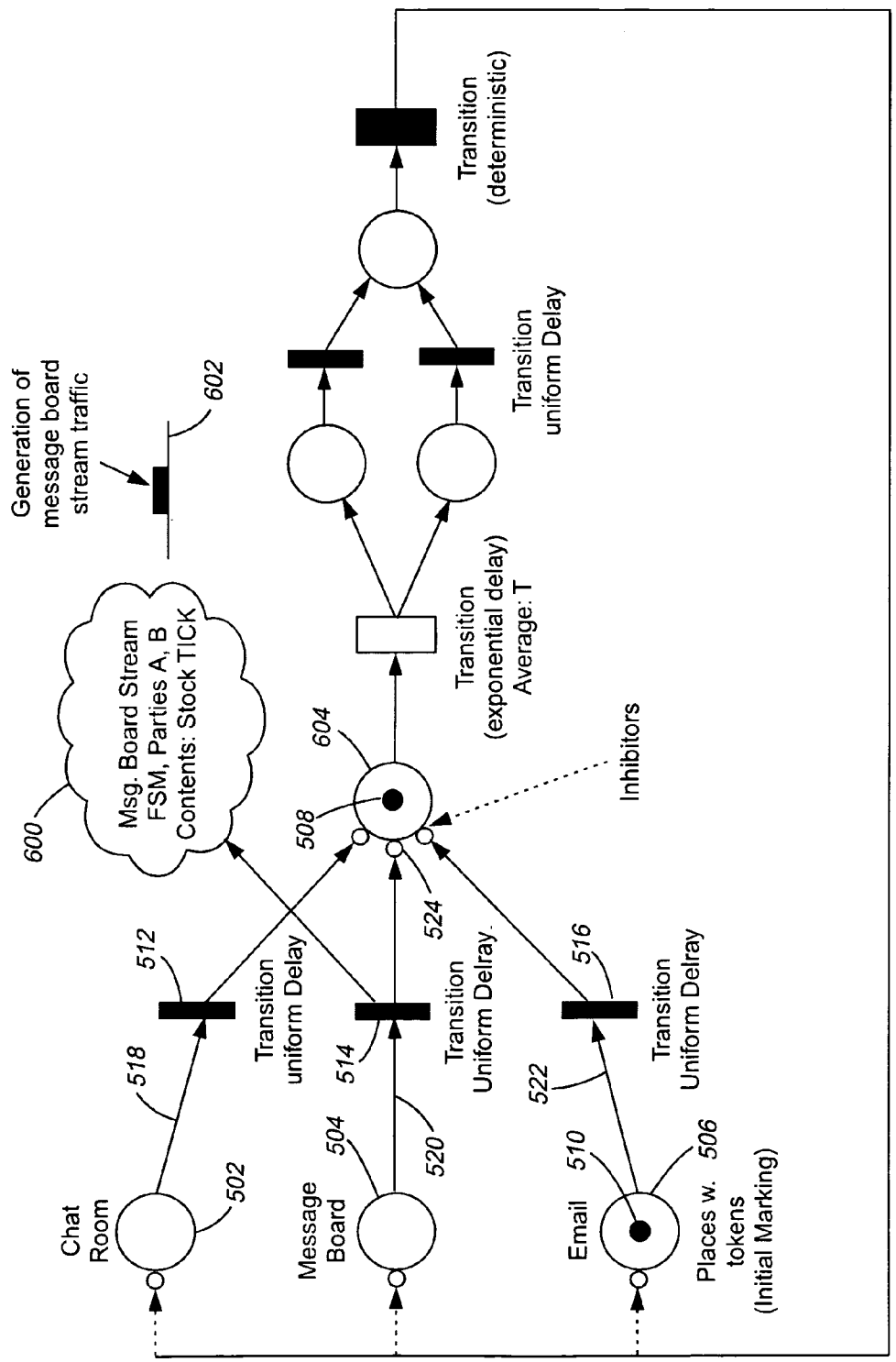

FIG. 6 shows the Petri Net 500 of FIG. 5 after the second transition 514 associated with the message board place 504 has fired. The second transition 514 fired after a uniform delay, in this embodiment. As can be seen, the Petri Net 500 is hierarchical, that is, the Petri Net 500 includes places that include another Petri Net. For example, a place such as the second place 504 for generating message board traffic according to specific parameters includes a Petri Net 600 modeling message board traffic. The Petri Net 600 generates a message board traffic stream 602 between parties A and B regarding a stock with stock symbol TICK. The instantiation of the Petri Net at the lower hierarchy is determined by parameters passed by the higher level Petri Net. This means that the number of places, transitions between places, token, initial placement of tokens, parameters associated with colored tokens, etc. are dynamically determined by the evolution of the higher level Petri Net. For example, the initial placement of tokens on the lower level Petri Net may depend on the transitions that fire at the higher-level Petri Net. In our specific example, in the example of insider trading, the parameters passed by the higher level Petri Net can be participants in a discussion, language, duration of communication, topics, and the like. In one embodiment, multiple Petri Nets are linked together to generate multiple correlated patterns at the same time. Templates (built-in library of Petri Nets) as described above can also be used for invoking building block in demand. In one embodiment of this invention, a system may contain a library a Petri Nets, each representing a different type of data stream. Each Petri Net will have a complete list of places and transitions. A user of the invention can create a more complex model for benchmarking a complex stream processing system by connecting the individual Petri Nets into a larger Petri Net. The linking requires one to specify the transitions between states of the different Petri Nets, as well as the parameters contained in the tokens that move between the different Petri Nets.

Figure 7:
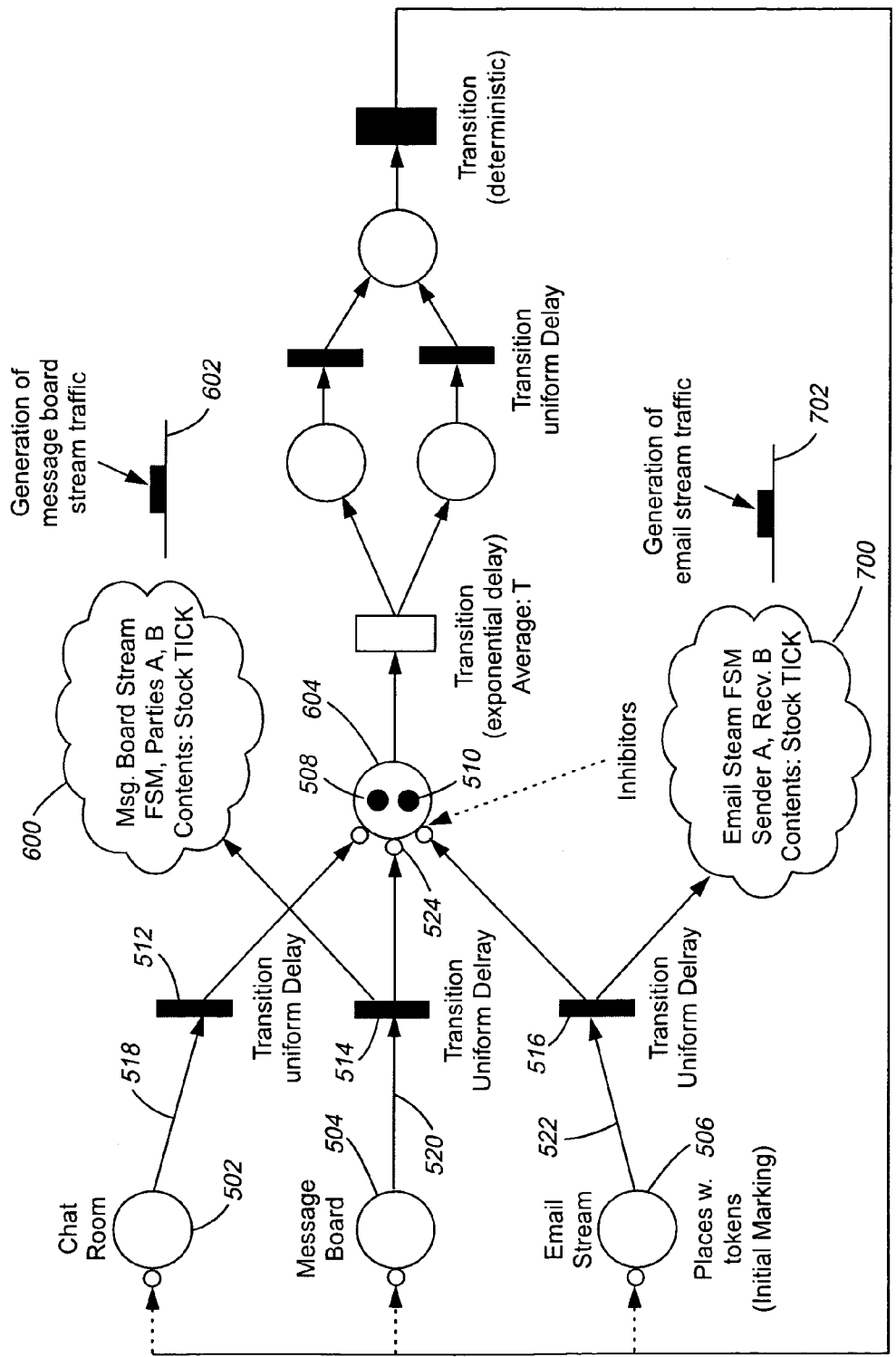
Figure 8:
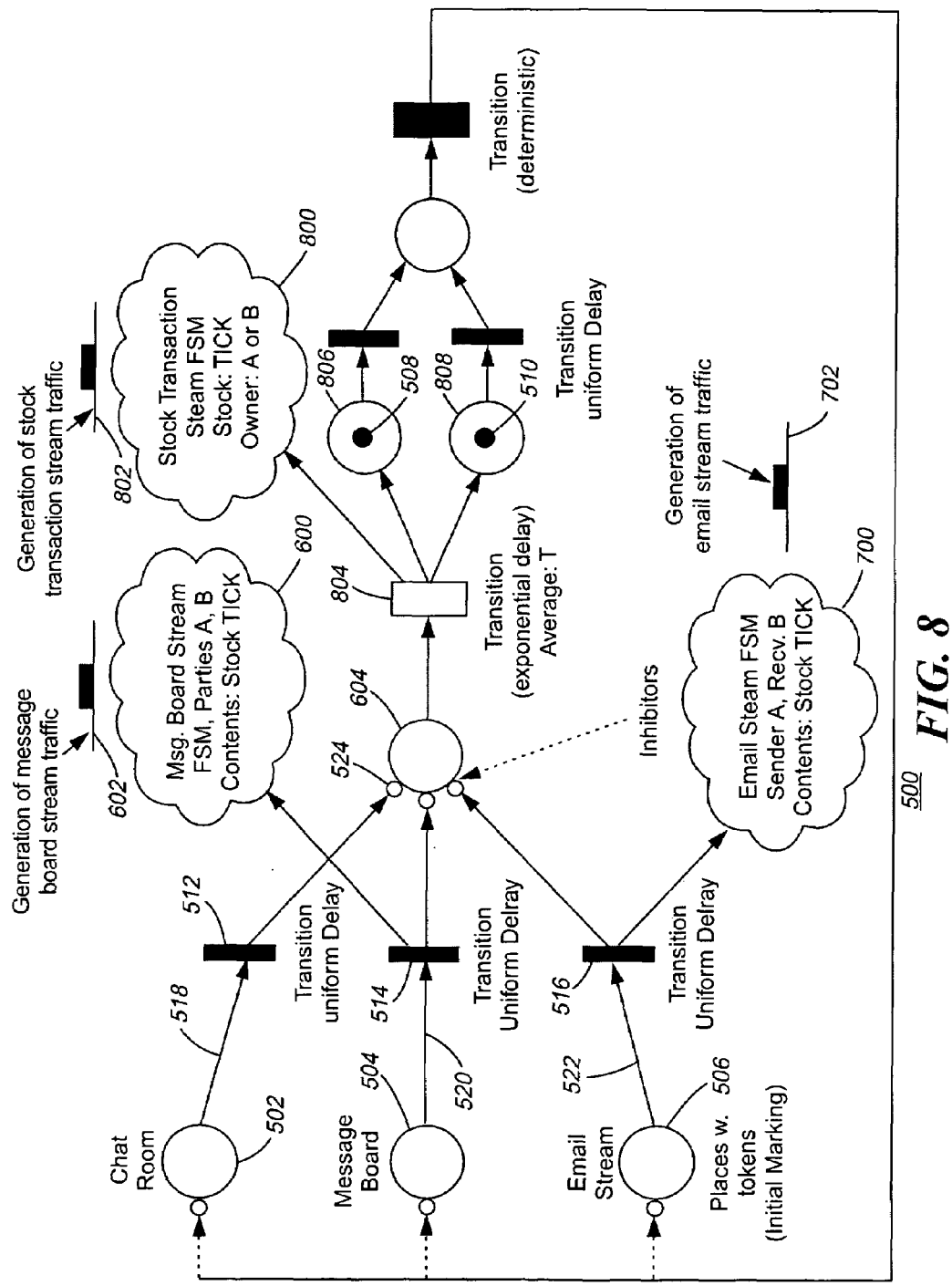
Figure 9:
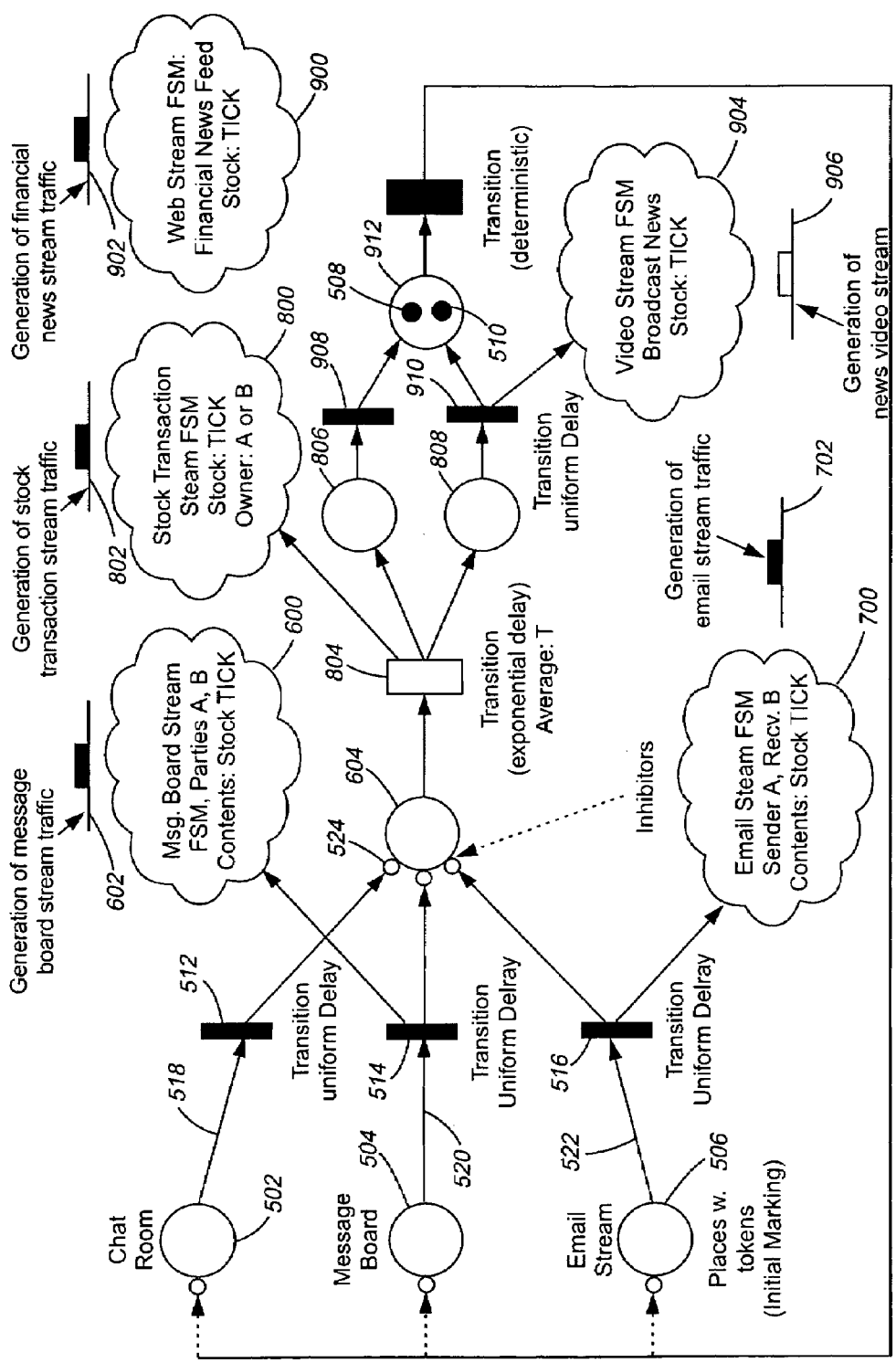

After the second transition 514 fires, the token 508 included at the second place 504 is now at a fourth place 604. After another uniform delay, the third transition 516 fires causing the token 510 associated with the third place 506 to move to the fourth place 604, as shown in FIG. 7. The third place 506 for generating email traffic according to specific parameters includes a Petri Net 700 for modeling chat room traffic. The Petri Net 700 generates an email stream 702 from sender A to receiver B including information about the stock TICK. After an exponential delay a fourth transition 804 associated with the fourth place 604 fires causing the token 508 associated with message board place 508 to move to a fifth place 806. The firing of the fourth transition 604 also causes the token 510 associated with the email place 506 to move to a sixth place 808.

The fourth place 604 is associated with another Petri Net 800, which generates a stock transaction stream 802 after the fourth transition fires. After another uniform delay, each a fifth transition 908 associated with the fifth place 806 and a and sixth transition 9010 associated with the sixth place 808 respectively fire. The fifth place 806 is associated with another Petri Net 900 which generates a financial news traffic stream 902 after the fifth transition 908 fires. The financial news traffic stream 902 includes data representing a financial news feed regarding the stock TICK.

The sixth place 808 is associated with another Petri Net 904, which generates a news video stream 906 after the sixth transition 910 fires. The news video stream 906 includes broadcast news data regarding the stock TICK. Once the fifth and sixth transitions 908, 910 fire, the tokens 508, 510 which originally started at the second and third places 504, 506 are now at a seventh place 912. A seventh transition associated with the seventh place 912 fires, in this embodiment, after a deterministic time delay, which brings the tokens back to the beginning of the Petri Net 500. This test can be run multiple times placing the tokens at different places. For example, one of the tokens can be placed at the first place 502 associated with chat room activity. Also, new parameters can be added to the tokens 508, 510 or the old parameters can be modified or removed.

As can be seen from FIGS. 5-9, the traffic streams 602, 702, 802, 902, 906 generated are correlated and are generated at different intervals of time. This temporal correlation is modifiable by a user of the testing system, or alternatively, by the user 106 of the system being tested.

Exemplary Process of Generating Correlated Traffic Streams

Figure 10:
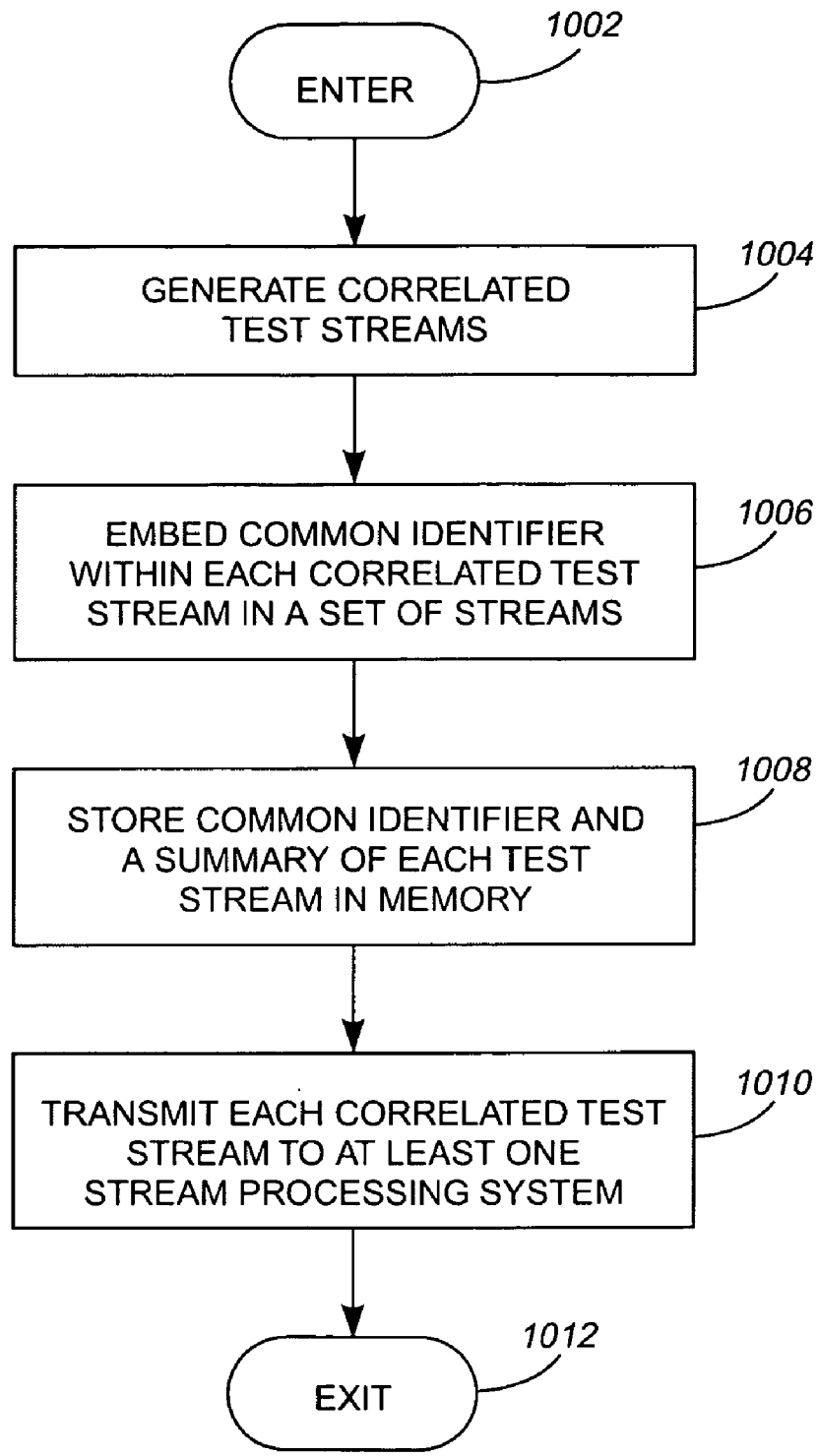
FIG. 10. is an operational flow diagram illustrating an exemplary process of generating correlated streams to be used for—a stream processing system, according to an embodiment of the present invention.

FIG. 10 is an operational flow diagram illustrating an exemplary process of generating correlated traffic streams. The operational flow diagram of FIG. 10 begins at step 1002 and flows directly to step 1004. The traffic stream generator 224, at step 1004, generates a plurality of correlated traffic streams 108 as described above with reference to FIG. 2 and FIGS. 5-9. A common identifier 116, at step 1006, is embedded within each correlated test stream 108. The common identifier 116 and metadata 226 associated with each traffic stream 108, at step 1008, are stored in memory 206. As described above with respect to FIGS. 1-2, each traffic stream in a set of traffic streams 108 has its own metadata 226. The metadata 226 is a summarization of the traffic stream. By storing metadata 226 and the common identifier 116, the testing system 102 is able to reconstruct a particular test performed on a tested system 104. For example, after the tested system 104 generates results 114 associated with particular traffic streams were received, the testing system 102 extracts the common identifier 116 information included in the results 114. The testing system 102 then uses the common identifier 116 information to the retrieve metadata information 226 associated with that common identifier 116. Each generated traffic stream, at step 1010, is transmitted to the system 104 to be tested. The control flow then exits at step 1012.

Exemplary Process of Comparing Results of Tested System

Figure 11:
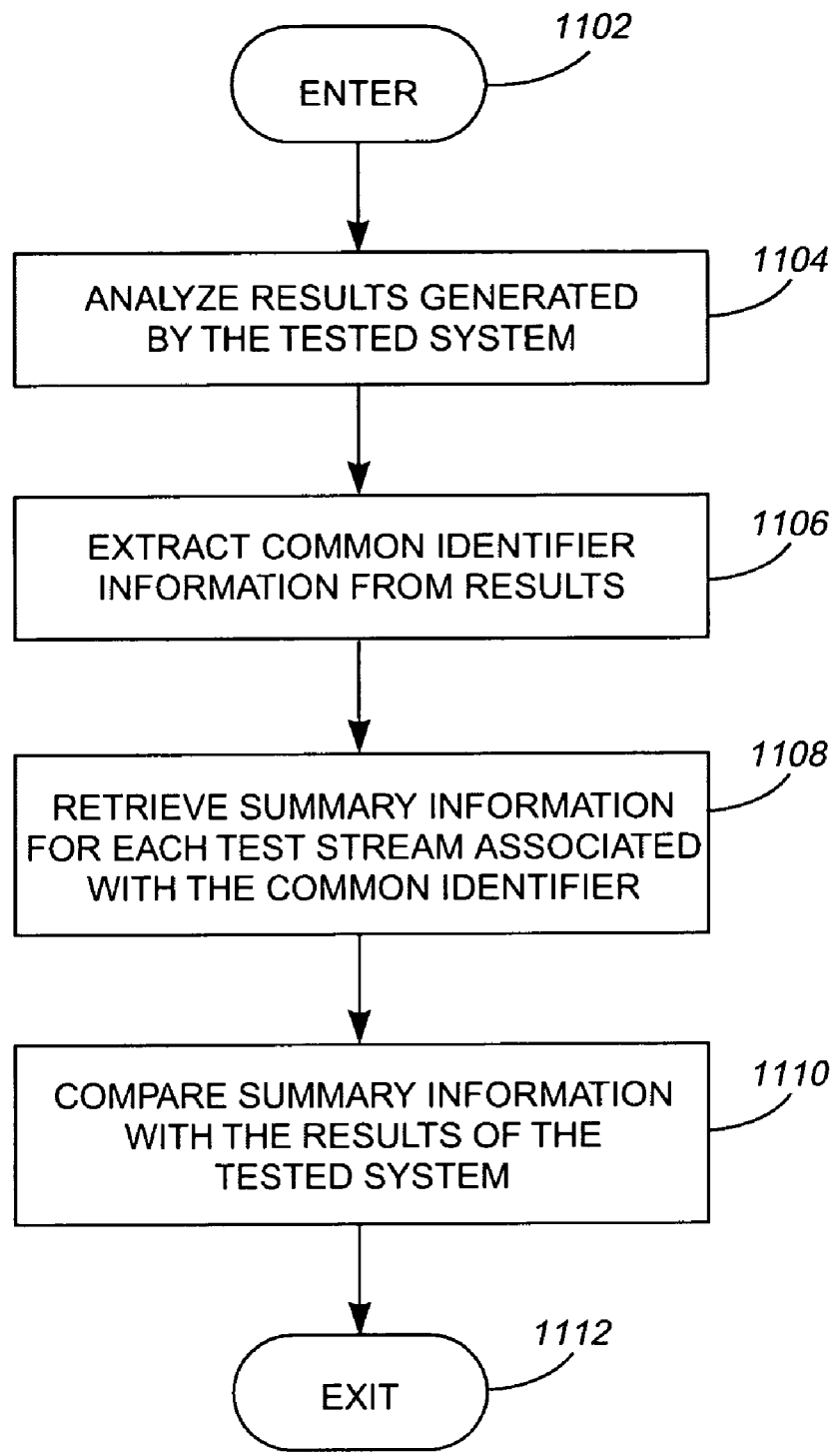
FIG. 11 is an operational flow diagram illustrating an exemplary process of benchmarking a stream processing system, according to an embodiment of the present invention.

FIG. 11 is an operational flow diagram illustrating an exemplary process of generating correlated traffic streams. The operational flow diagram of FIG. 11 begins at step 1102 and flows directly to step 1104. The testing system 102, at step 1104, analyzes the results 114 generated by the tested system 104. As described above, the results 114, in one embodiment, can include binary data indicating the presence (or lack thereof) of correlated content. The results 114 can also include segments of received streams including relevant content. The correlation results comparator 228, at step 1106, extracts the common identifier 116 from the results 114. The correlation results comparator 228, at step 1108, retrieves the metadata 226 for each of the traffic streams associated with the common identifier 116. The correlation results comparator 228, at step 1110, compares the metadata information 226 with the results 114 to determine how well the tested system detected the correlation among the inputted traffic streams. The control flow then exits at step 1112.

Non-Limiting Examples

The foregoing embodiments of the present invention are advantageous because multiple traffic streams, which are correlated, can be generated and inputted into a system to be tested. The presented invention allows for the testing and benchmarking of systems which make intelligent decisions based on analysis of content in correlated streams.

The present invention can be realized in hardware, software, or a combination of hardware and software. A system according to a preferred embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

Embodiments of the invention can be implemented as a program product for use with a computer system such as, for example, the computing environment shown in FIG. 1 and described herein. The program(s) of the program product defines functions of the embodiments (including the methods described herein) and can be contained on a variety of computer readable media. Illustrative computer readable medium include, but are not limited to: (i) information permanently stored on non-writable storage medium (e.g., read-only memory devices within a computer such as CD-ROM disk readable by a CD-ROM drive); (ii) alterable information stored on writable storage medium (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such computer readable media, when carrying computer-readable instructions that direct the functions of the present invention, represent embodiments of the present invention.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It is also clear that given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.) It should be appreciated that the invention is not limited to the specific organization and allocation or program functionality described herein.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method on an information processing system for benchmarking a stream processing system, the method comprising:

generating a plurality of correlated test streams;

embedding a semantically related data set within each of the test streams in the plurality of correlated test streams;

providing the plurality of correlated test streams to at least one stream processing system, whereby the stream processing system produces an output data set including a set of zero or more correlation results;

generating a summary for each of the semantically related embedded data sets;

storing a copy of each summary in memory;

embedding a common identifier within each stream in the plurality of correlated test streams, wherein the common identifier is transparent to the at least one stream processing system so as not to affect the set of the correlation results, and wherein the common identifier uniquely identifies the plurality of correlated test streams;

extracting the common identifier from the output data set generated by the stream processing system; and comparing at least one of the common identifier and the stored copies of the summaries to the output data set generated by the stream processing system.

2. The method of claim 1, wherein the plurality of correlated test streams includes at least one of:

temporal correlation;
contextual correlation;
community interest correlation; and
set correlation.

3. The method of claim 1, wherein the providing of the correlated test streams further comprises providing a user configurable variable time delay to separate at least two of the plurality of correlated test streams.

4. The method of claim 1, wherein at least one of the plurality of correlated test streams is dynamically modifiable.

5. The method of claim 1, wherein the generating further comprises using at least one finite state machine to generate the plurality of correlated test streams.

6. The method of claim 5, wherein the at least one finite state machine includes at least a second finite state machine used in parallel to generate multiple sets of correlated test streams.

7. The method of claim 5, wherein a set of correlations between the plurality of correlated streams within the finite state machine is dynamically modifiable by a user.

8. The method of claim 5, wherein the finite state machine is automatically generated based on a correlation inquiry submitted by a user.

9. The method of claim 5, wherein the finite state machine is constructed using at least one of:

a scripting language;
a Markov chain; and
a Petri net.

10. The method of claim 1, wherein the plurality of correlated test streams is provided on multiple instances to the stream processing system for creating the set of zero or more correlation results, wherein at least one correlation parameter for at least one of the plurality of correlated test streams is modified for at least one of the multiple instances.

11. The method of claim 1, wherein the common identifier comprises at least one of:

a number of transitions between at least two of the plurality of correlated streams that fired; and a delay value associated between at least two of the plurality of correlated streams.

* * * * *